United States Patent
Hübner et al.

(10) Patent No.: US 8,669,193 B2
(45) Date of Patent: Mar. 11, 2014

(54) SHEET MATERIAL FOR A FOLDING WALL OF A TRANSITION DEVICE AND THE METHOD FOR THE PRODUCTION OF SUCH SHEET MATERIAL

(75) Inventors: Reinhard Hübner, Kassel (DE); Volker Jünke, Felsberg (DE); Kirsten Schmaler, Tettau (DE); Uwe Werner, Lauchhammer (DE)

(73) Assignee: Hübner GmbH & Co., KG, Kassel (DE)

( * ) Notice: Subject to any disclaimer, the term of this patent is extended or adjusted under 35 U.S.C. 154(b) by 214 days.

(21) Appl. No.: 13/176,245

(22) Filed: Jul. 5, 2011

(65) Prior Publication Data

US 2012/0009835 A1    Jan. 12, 2012

(51) Int. Cl.
    *B32B 27/04*    (2006.01)
(52) U.S. Cl.
    USPC ............ 442/64; 442/15; 442/37; 442/59; 442/65; 442/66; 442/67; 442/260; 442/280; 442/293; 442/300; 442/399; 105/18

(58) Field of Classification Search
    USPC ............ 442/15, 37, 59, 260, 280, 293, 300, 442/399, 64–67
    See application file for complete search history.

(56) References Cited

U.S. PATENT DOCUMENTS

2011/0290146 A1* 12/2011 Maerten .................. 105/18

FOREIGN PATENT DOCUMENTS

| DE | 19757429 A1 | 12/1997 |
| DE | 102006061503 A1 | 6/2008 |
| DE | 102008037417 A1 | 4/2010 |
| WO | WO 2010063949 A1 * | 6/2010 |

* cited by examiner

*Primary Examiner* — Peter Y Choi
(74) *Attorney, Agent, or Firm* — Gifford, Krass, Sprinkle, Anderson & Citkowski, P.C.

(57) ABSTRACT

The subject of this invention is a sheet of material for the manufacture of a folding wall of a transition between two articulated vehicle units, as well as the folding wall of a passenger boarding bridge or passenger stairs, wherein the sheet material has at least one reinforcement element, with the reinforcement element is coated on both sides with a plastic layer, wherein the at least one reinforcement element has on one side a coating based on a silicone rubber and on the other side a coating based on an organic rubber.

6 Claims, 1 Drawing Sheet

SHEET MATERIAL FOR A FOLDING WALL OF A TRANSITION DEVICE AND THE METHOD FOR THE PRODUCTION OF SUCH SHEET MATERIAL

CROSS-REFERENCE TO RELATED APPLICATIONS

This application claims priority of German Patent Application DE102010026115.7-21 filed Jul. 5, 2010.

FIELD OF THE INVENTION

The invention relates to a sheet material of a folding wall of a transition device between two vehicles coupled by means of an articulated connection, as well as to a folding wall of passenger boarding bridges (bridge) or a passenger stairs, where the sheet material comprises at least one reinforcement element, with the reinforcement element being coated on both sides with a layer of plastic.

The invention also provides a method for manufacturing a folding wall and a sheet material for a folding wall.

BACKGROUND OF THE INVENTION

Folding walls are well-known as wave or folding walls. They are usually used as part of a transition between two articulated vehicle units and, as such, surround the transition bridge tunnel-like. Folding walls are also known in passenger boarding bridges or gangways.

With wave or folding walls, the individual folds or waves consist of sheets of material, with the each wave or fold sheet being connected to an adjacent wave or fold sheet in order to form the wave or folding wall, in particular by means of a folding wall frame, as is known from the prior art.

Especially with a folding wall, the design is such that the folding wall frames are provided only on the outer side of the folding wall to secure the transition between two folds.

The sheet of such a wall comprises at least one reinforcement element, for example, in the form of a fabric, a knitted fabric, or a scrim, with this reinforcement element usually being coated on both sides. A wide variety of rubber or rubber compounds are available for the coating, including elastomers in the form of vulcanized silicone rubber or organic rubbers, such as CSM (chloro-sulfonated polyethylene). The advantage of using an elastomer based on a silicone rubber for coating the reinforcing elements for the manufacture of a folding wall, for example in rail transport, is a high level of flame resistance of silicone, good colorability, and the increased temperature flexibility. A disadvantage of the use of silicone rubbers is the high price.

In addition, there are also folding walls made of a fabric coated with an organic elastomer, such as a CSM, with organic elastomers being cheaper than silicone elastomers. A fabric coated, for example, with a CSM elastomer is not quite as flexible as a fabric coated with a silicone elastomer, and, in addition, it cannot be manufactured in all colors. So, for example, it is not possible to produce a coating with a white CSM. This is so, because such a CSM is already not white in its basic substance and, to make matters worse, it does change its color in the sun, albeit slowly. In terms of flame resistance, specific measures must be taken to make such a fabric coated with CSM flame resistant.

In contrast, a fabric coated with vulcanized silicone rubber can not only be made flame-resistant, but is also stable at higher temperatures.

In this context it should be noted that the flame resistance and the color stability on the outside of a folding wall is of relevance. This is so, because this side of the folding wall is exposed to the weather, and—in addition—it has turned out to also be an advantage if the color can be precisely matched to the color of, for example, the main vehicle body.

SUMMARY OF THE INVENTION

The objective of the present invention is to combine the advantages of a reinforcement element coated with a silicone elastomer with the economy of a reinforcement element coated with an organic elastomer, such as a fabric for the manufacture of a sheet material for a folding wall.

In this context, the invention provides a sheet material of the aforementioned type, which is characterized in that the at least one reinforcement element has on one side a coating based on a silicone rubber and, on the other side, a coating based on an organic rubber. Silicone rubbers are different from the organic rubbers in that the main chain is not built by carbon compounds, but rather consists of alternating silicon and oxygen atoms. In fact, the rubber used is actually unblended rubber components or a blend of rubber components with the addition of the blend ingredients, in particular for vulcanization. After applying the coating, curing takes place to produce the respective elastomer, whereby the process of vulcanization occurs at elevated temperature through the commercially available crosslinking agents that are present in the blend ingredients. This means that there are applied two mixtures with different and normally not compatible cross-linking systems to a reinforcement element. The reinforcement element can be constructed as a woven fabric, knitted fabric, or scrim. In particular, when the coating is a silicone elastomer on the outside of the folding wall, the same advantages are realized that also a folding wall coated with a silicone elastomer possesses. Such a folding wall is flame retardant, which is of particularly high importance on the outside of the folding wall, because it has been shown that in most cases the risk of fire posed to a folding wall comes from outside influences. So also the fire resistance test is performed such that the folding wall is subjected to extreme heat from the outside. It is immediately apparent that under these circumstances, a folding wall whose reinforcement elements are coated with a silicone elastomer on the outside meets higher standards in so far as to fire resistance. Such a folding wall is also weather resistant, in particular, it retains its color, i.e., in particular it does not yellow, and it is cold-elastic over a wide temperature range. In contrast, on the inside of the folding wall, there is provided a coating with an organic elastomer, such as a CSM, that perfectly complies with the prevailing requirements.

Both a coating based on a silicone rubber, and a coating based on an organic rubber must be vulcanized to obtain an elastomer. So far, the experts assumed that due to the different vulcanization conditions and components of coatings based on silicone rubber on the one hand, and coatings based on organic rubbers on the other hand, the use of two such different coatings on a reinforcement element, such as a tissue, is not viable.

However, it has surprisingly been found that a coating of a reinforcement element on one side with a silicone elastomer and on the other side with an organic elastomer, for example, a CSM, is possible, if first the silicone component is applied to the reinforcement element, the coating on the basis of a silicone rubber is vulcanized, and then the coating based on an organic rubber, especially a CSM, is applied to the reinforcement element, and subsequently, this layer is fully cured.

Advantageous features and embodiments of the invention will become obvious from the subsidiary claims and the independent claims.

A subject of this invention is also a folding wall of a transition between two interconnected vehicles or the folding wall of a passenger boarding stairs or a boarding bridge, wherein such a folding wall is characterized by at least one piece of a sheet material. This means that, for example, a folding wall is built of several sheets of material, wherein the at least one reinforcement element is coated on one side with a coating based on a silicone rubber and, on the other side, with a coating based on an organic rubber, for example, a CSM. After the vulcanization of the layers to an elastomer on at least one reinforcement element, the individual sheets of material are connected to each other to form the corresponding waves or folds of a folding wall or corrugated wall, wherein in the transition zone of a fold or wave to the adjacent fold or wave a peripheral folding wall frame is provided. The folding wall is in the cross section U-shaped and holds the two ends of two adjacent waves or folds.

It has already been pointed out that the coating of the folding wall based on a silicone rubber is on the outside, while the coating based on an organic elastomer is on the inside. The advantage consists especially in the high flame resistance of the silicone material, assuming that the flame resistance is to be given on the outside of the folding wall.

The invention also includes a structure of a transition between two intermeshed folding wall, for example, in the form of a double wave wall as part of a transition between the ends of two pivotally interconnected vehicles. With such a double folding wall, it is envisaged that the coatings of the two folding wall based on an organic rubber are arranged on the facing sides of the folding wall, whereby the coating based on a silicone rubber is provided on the outer side accordingly, and the corresponding coating on the inner folding wall is assigned to the inside of the inner folding wall.

BRIEF DESCRIPTION OF THE DRAWINGS

The invention will now be explained in greater detail with reference to the drawings.

DETAILED DESCRIPTION OF THE INVENTION

Figure 1:
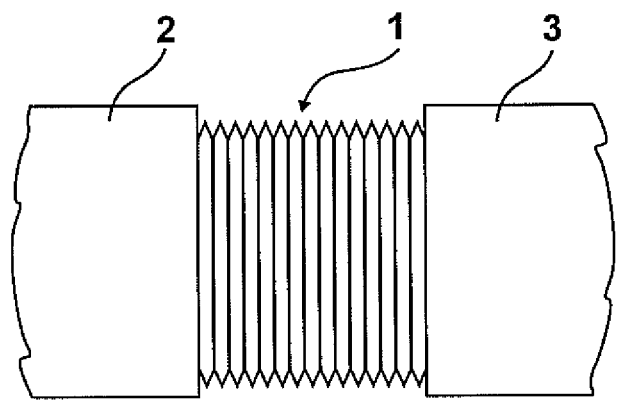
FIG. 1 shows schematically the two vehicle parts of an articulated vehicle with a folding wall.
Figure 2:
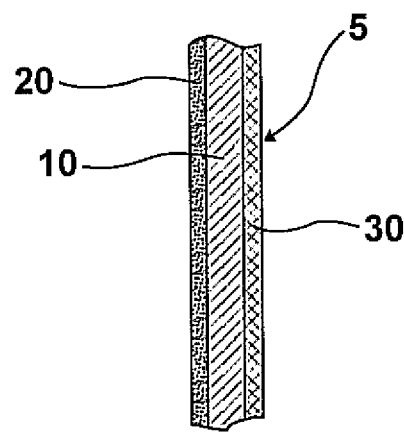
FIG. 2 shows schematically the inventive design of a sheet material in the cross-section.

Between the two vehicles parts 2, 3 of an articulated vehicle, there is the folding transition wall, wherein the folding wall can be designed as a folding wall or corrugated folding wall (FIG. 1). The subject of the invention is the sheet material 5 for the manufacture of a folding wall.

The at least one reinforcement element 10 of the sheet material 5 is coated on one side with a rubber silicone 30, wherein after the coating of the reinforcement element, such as a fabric, a knitted fabric or a scrim, this layer on the basis of the silicone rubber is vulcanized. After the process of the vulcanization, the other side of the reinforcement element is coated with a rubber based on an organic elastomer, for example, a CSM, coated and then this layer is vulcanized.

The invention claimed is:

1. A sheet material of a folding wall of a transition between two articulated vehicles and the folding wall of a passenger boarding bridge or passenger boarding stairs, wherein the sheet material has at least one reinforcement element, with the reinforcement element being coated on both sides with an elastomer layer, characterized in that the at least one reinforcement element has on one side a silicone rubber coating and on the other side an organic rubber coating.

2. The sheet material according to claim 1, characterized in that the reinforcement element is a fabric, knitted fabric, or a scrim.

3. The sheet material according to claim 1, characterized in that the elastomer material on one of the sides is a CSM.

4. A method for producing a sheet material for a folding wall of a transition between two articulated vehicles or the folding wall of a passenger boarding bridge or stairs, wherein the sheet material has at least one reinforcement element, characterized in that that the reinforcement element has on the one side a silicone rubber coating and on the other side an organic rubber coating, wherein after applying the silicone rubber coating on one side of the reinforcement element, the silicone rubber coating on the least one reinforcement element is vulcanized, wherein after the vulcanization of the silicone rubber coating, the organic rubber coating is applied on the free side of the at least one reinforcement element, and the organic rubber coating on the at least one reinforcement element is subsequently vulcanized.

5. The folding wall of a transition between two articulated vehicles or the folding wall of a passenger boarding bridge or stairs, characterized in that the folding wall has at least one piece of sheet material according to claim 1.

6. The folding wall of a transition between two articulated vehicles or the folding wall of a passenger boarding bridge or stairs according to claim 5, characterized in that the silicone rubber coating is arranged on the outside of the folding wall and the organic rubber coating is arranged on the inside of the folding wall.

* * * * *

UNITED STATES PATENT AND TRADEMARK OFFICE
CERTIFICATE OF CORRECTION

PATENT NO. : 8,669,193 B2
APPLICATION NO. : 13/176245
DATED : March 11, 2014
INVENTOR(S) : Reinhard Hübner et al.

It is certified that error appears in the above-identified patent and that said Letters Patent is hereby corrected as shown below:

On the Title Page:

Item (30) Under "Foreign Application Priority Data," please insert --July 5, 2010, (DE), 10 2010 026 115.7.--

In the Claims:

At column 4, claim number 4, line numbers 26-39, please delete claim 4 and insert --A method for producing a sheet material of claim 1, wherein after applying the silicone rubber coating on the first side of the reinforcement element, the silicone rubber coating is vulcanized, wherein after the vulcanization of the silicone rubber coating, the rubber coating is applied on the second side of the at least one reinforcement element, and the organic rubber coating is subsequently vulcanized.--

Signed and Sealed this
Fifth Day of August, 2014

Michelle K. Lee
*Deputy Director of the United States Patent and Trademark Office*